(12) United States Patent
Barth et al.

(10) Patent No.: US 6,904,991 B2
(45) Date of Patent: Jun. 14, 2005

(54) METHOD AND DEVICE FOR STABILIZING A VEHICLE

(75) Inventors: Guenter Barth, Markgroeningen (DE); Frank Leibeling, Moeglingen (DE); Michael Kroehnert, Farmington Hills, MI (US)

(73) Assignee: Robert Bosch GmbH, Stuttgart (DE)

(*) Notice: Subject to any disclaimer, the term of this patent is extended or adjusted under 35 U.S.C. 154(b) by 6 days.

(21) Appl. No.: 10/626,678

(22) Filed: Jul. 24, 2003

(65) Prior Publication Data

US 2004/0222027 A1 Nov. 11, 2004

(30) Foreign Application Priority Data

Jul. 30, 2002 (DE) ......................... 102 34 606

(51) Int. Cl.[7] .............................. B60K 17/348
(52) U.S. Cl. ................. 180/197; 701/76; 701/84; 701/92
(58) Field of Search ............... 701/76, 83, 84, 701/88, 92, 89; 180/197, 233, 248, 249

(56) References Cited

U.S. PATENT DOCUMENTS

| 4,589,511 A | | 5/1986 | Lieber |
| 4,671,373 A | | 6/1987 | Sigl |
| 5,025,882 A | * | 6/1991 | Ghoneim et al. ........... 180/197 |
| 5,164,902 A | * | 11/1992 | Kopper et al. ................ 701/76 |
| 5,357,434 A | * | 10/1994 | Zimmer et al. ............... 701/75 |
| 5,630,480 A | | 5/1997 | Nishikata |
| 5,850,616 A | * | 12/1998 | Matsuno et al. .............. 701/82 |
| 6,199,650 B1 | * | 3/2001 | Masberg et al. ............ 180/197 |
| 6,324,458 B1 | * | 11/2001 | Takagi et al. ................. 701/70 |
| 6,371,234 B2 | * | 4/2002 | Yasuda ........................ 180/197 |
| 6,419,038 B1 | * | 7/2002 | Hessmert et al. ........... 180/197 |
| 2002/0040269 A1 | * | 4/2002 | Billig et al. .................. 701/87 |

FOREIGN PATENT DOCUMENTS

| DE | 100 50 173 | 4/2001 |
| GB | 2 305 701 | 4/1997 |

* cited by examiner

Primary Examiner—Avraham Lerner
(74) Attorney, Agent, or Firm—Kenyon & Kenyon

(57) ABSTRACT

A method and a device for stabilizing a vehicle having at least one wheel tending to spin, are provided. In response to the tendency to spin, a driver-independent braking intervention occurs in the at least one wheel. The engine torque is reduced if the driver-independent braking intervention has not resulted in stabilizing the vehicle.

16 Claims, 3 Drawing Sheets

METHOD AND DEVICE FOR STABILIZING A VEHICLE

FIELD OF THE INVENTION

The present invention is directed to a method and a device for stabilizing a vehicle.

BACKGROUND INFORMATION

A conventional method and a device for implementing a differential lock function for a vehicle is described in published German Patent Application No. 100 50 173. The vehicle is an all-wheel drive vehicle and the differential lock function is used to implement an interaxle-differential lock acting between the front axle and the rear axle of the vehicle. If at least one driven wheel tends to spin, this method is used to implement the function of the differential lock on at least one means for influencing the wheel torque by performing driver-independent interventions. At least one setpoint value for a wheel torque to be set is specified for carrying out the interventions performed independently of the driver.

SUMMARY OF THE INVENTION

The present invention is directed to a method of stabilizing a vehicle in which, in response to at least one wheel tending to spin, it is possible to activate a reduction of the engine torque and driver-independent braking interventions, whereby a driver-independent braking intervention occurs in at least the wheel tending to spin.

One advantage of the invention is that the engine torque is reduced only if the driver-independent braking intervention has not resulted in stabilizing the vehicle. This ensures that the engine torque is reduced only after the attempts at stabilizing the wheels made possible by braking interventions did not alone achieve the objective. The phrase "stabilizing the vehicle" is understood to mean that the spinning of the wheels or the tendency to spin is reduced or ceased.

An exemplary embodiment may be characterized in that the braking intervention occurs with equal intensity at both wheels of a driven axle. This prevents the formation of a yaw moment about the vertical axis of the vehicle.

Another exemplary embodiment may be characterized in that the vehicle is an all-wheel drive vehicle and during the cited braking intervention, no braking intervention occurs at the wheels of the other driven axle. It is thus possible to exempt the wheels of the axle not having excessively high slip from the braking interventions.

Another exemplary embodiment may be characterized in that the engine torque is reduced if the difference between a variable determined from the wheel rotational speeds of the braked wheels and a setpoint value for this variable exceeds a specifiable first threshold value, which is different from zero. In modern vehicles the wheel rotational speeds are already available as determined variables. For that reason, no additional vehicle sensor system is necessary for this embodiment.

Another exemplary embodiment may be characterized in that reduction in engine torque presently occurring is ended if the difference between a variable determined from the wheel rotational speeds of the braked wheels and a setpoint value for this variable falls below a specifiable second threshold value, which is different from zero. This provides the possibility of a hysteresis characteristic in relation to the reduction of engine torque.

This hysteresis characteristic is present if the second threshold value is lower than the first threshold value. The hysteresis characteristic avoids vibrations caused by regulation.

Another exemplary embodiment may be characterized in that the variable determined from the wheel rotational speeds of the braked wheels is the actual value of the cardan shaft speed, e.g., the mean or weighted values of the wheel speeds of the (two) braked wheels, and the setpoint value for this variable is the setpoint cardan shaft speed. These variables may be available, for example, in a traction control system. Here, the term "wheel speed" may be understood in a broad sense. A variable describing or characterizing the wheel rotational speed or, for example, the circumferential speed of the wheel may expressly be included.

Advantageously, the method of implementing a differential lock function is used in the longitudinal direction. The possibility of implementing a differential lock function is thus presented in an inexpensive and robust manner. This is also expressed, for example, by the fact that it is possible to implement the differential lock function without additional mechanical devices.

The present invention also includes a device for stabilizing a vehicle in response to at least one wheel tending to spin which includes reducing means for reducing the engine torque and braking means for carrying out driver-independent braking interventions, via which a driver-independent braking intervention occurs in at least this wheel tending to spin, wherein the engine torque is reduced in the reducing means only if the driver-independent braking intervention via the braking means has not resulted in stabilizing the vehicle.

DETAILED DESCRIPTION

Figure 1:
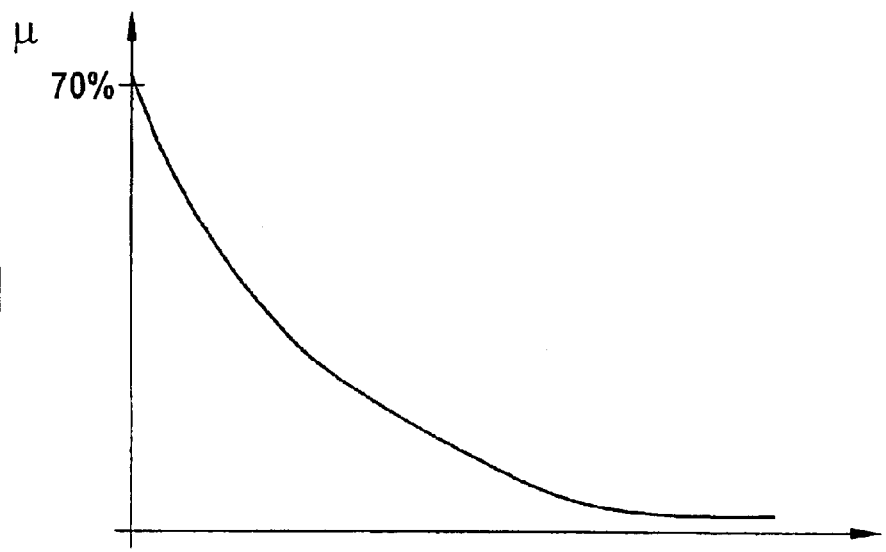
FIG. 1 shows the relationship between the desired setpoint slip and longitudinal vehicle speed vf according to the present invention.

The drive torque of the engine is distributed uniformly to the two wheels of one axle by a differential (differential drive).

One advantage is that, for example, when accelerating (even on a road surface which is slippery on one side), no significant yaw moment arises which acts on the vehicle. This is due to the fact that the low drive torque that may be delivered to the road on the slippery side of the road surface is also delivered to the road on the non-skid side of the road.

One disadvantage may be that, for example, the traction force acting on the vehicle is determined by the wheel having the lower adhesive friction value. This may be remedied by using (mechanical) locking differentials. They prevent a wheel from spinning by diverting the surplus drive torque (which is not transferable to the road at that location) to the wheel having the higher adhesion potential. In return, however, it is now possible for a yaw moment to occur, which acts on the vehicle.

A driver-independent braking operation on the spinning wheel implements the function of a differential lock electronically.

In addition, an interaxle differential is also present in all-wheel drive vehicles to distribute the engine torque between the front and rear axle. A weighted distribution of torque is made to the drive axles.

In all-wheel drive vehicles, optimum traction may be possible if the drive torque is not reduced until the adhesive friction value is completely exhausted at both axles. For that reason, two measures may be taken to obtain optimum traction:

- If needed, an interaxle-differential lock reduces the drive torque acting on the road through braking interventions in such a way that the wheels continue to be stable.
- The engine regulator does not reduce the drive torque or reduces it only when it is absolutely necessary, i.e., the drive torque is reduced only after the total potential at both axles is exhausted.

For vehicles having any structurally inherent torque distribution, the maximum possible torque is transferred to the road at each axle.

At the same time, a temperature monitoring of the brakes is integrated to protect the brakes from overheating. This temperature monitoring may also be performed by a temperature monitor integrated in a control unit.

The interaxle differential ensures that the drive torques are distributed to the front axle and the rear axle of the vehicle. Frequently, an asymmetrical distribution of the drive torques to the front axle and the rear axle of the vehicle is desired. A typical distribution of the drive torque may be, for example, 40% of the engine torque is available to the front axle and 60% of the engine torque is available to the rear axle.

This unequal distribution may be appropriate because the greater tire contact forces act upon the rear wheels during acceleration.

However, even this distribution may also result in disadvantages in a standing start on a surface having a low adhesive friction value ("low-$\mu$"). On a low-$\mu$ road surface, only low longitudinal acceleration is possible. For that reason, there is only a slight difference between the tire contact forces of the front axle and the rear axle. The result of this is that it is not possible to fully deliver the 40% of the engine torque to the road via the front wheels (since the limitation is greater than 60% of the engine torque to the rear wheels). This is associated with the fact that the wheel load of the rear wheels is usually significantly lower than the wheel load of the front wheels because the engine is usually installed in the front end of passenger cars. For that reason, the rear wheels reach the critical slip limit sooner than the front wheels.

The next thing that might be considered is a road surface condition having a low adhesive friction value at the rear wheels and a high adhesive friction value at the front wheels. When accelerating on this road surface, the TCS regulator assigns a braking torque to the rear wheels. The result of this is that the front wheels are enabled to deliver the 40% of the engine torque assigned to them to the road and thus accelerate the vehicle. The braking torque applied to the rear wheels has the same effect as an acceleration torque delivered to the road: Both have a braking effect on the wheel. For that reason, the interaxle differential is unable to differentiate whether the braking torque at the rear wheels is derived from the brake (and accordingly does not have an accelerating effect on the vehicle) or is derived from the road surface (and accordingly has an accelerating effect on the vehicle). In both cases, however, the differential delivers a torque to the front axle that corresponds to the braking torque of the rear wheels and this torque at the front wheels results in accelerating the vehicle.

For that reason, the TCS logic in the start-off range provides that the surplus torque (which is not transferable to the road) is "braked away" at the rear wheels. The term "braked away" should be understood to mean that this surplus torque is intercepted by a braking intervention and converted into thermal energy.

In addition to the braking operation, the TCS regulation also provides a second consequence: The reduction of engine torque. The reduction of engine torque results in a reduction of cardan shaft speed. This is described in the following sections.

The TCS regulation is essentially based on the dependence of desired setpoint slip $\mu$setpoint on longitudinal vehicle speed vf. In the initial start-off phase (vf is still very low), a very high slip value (between 70% and 80%, for example) is desirable to make it possible to achieve significantly high wheel rotational speeds. This controlled setpoint slip is reduced as the speed increases and assumes values in the order of magnitude of 3% at very high speeds. An exemplary characteristic, which conveys the relation between setpoint slip $\mu$setpoint and longitudinal vehicle speed vf, is shown in FIG. 1.

Specifying a setpoint value for the cardan shaft speed adjusts the wheel setpoint slip (the cardan shaft speed is the speed output by the engine (or a measure corresponding to the angular speed of the cardan shaft)).

Figure 2:
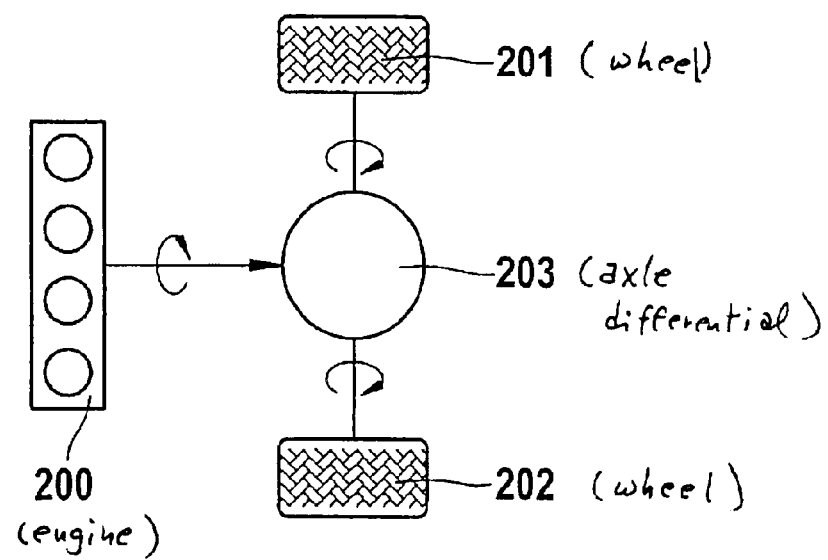
FIG. 2 shows a diagram illustrating an assignment of cardan shaft speed and wheel rotational speeds to the system made up of the engine, differential and wheels according to the present invention.

This is shown in FIG. 2. Block 200 denotes the engine of the vehicle, which delivers cardan shaft speed vkard to an axle differential 203. The object of the axle differential is to distribute vkard to left wheel 201 and right wheel 202. In this connection, left wheel 201 rotates at speed vL and the right wheel at speed vR.

While vL is normally equal to vR in straight-ahead driving, it is different when cornering: Then the outside wheels must rotate faster.

However, the following always applies to cardan shaft speed vkard: vkard=(vR+vL)/2.

Via the slip curve (FIG. 2), a setpoint rotational speed (or setpoint circumferential speed) vR_setpoint is selected (for the right wheel) and vL_setpoint (for the left wheel) for each of the wheels. This corresponds to the requirement of a setpoint cardan shaft speed:

$$v\text{kard\_setpoint}=(v\text{R\_setpoint}+v\text{L\_setpoint})/2.$$

However, the cardan shaft speed delivered at the present point in time by the engine might be:

$$v\text{kard\_actual}=(v\text{R\_actual}+v\text{L\_actual})/2,$$

where vR_actual and vL_actual are the wheel speeds of the left and right wheel present at the actual time.

One of the objects of the present invention is to allow a deviation between setpoint cardan shaft speed vkard_setpoint and actual cardan shaft speed vkard_actual without a reduction of engine torque Mmot (and accordingly a reduction of the actual cardan shaft speed) occurring. The difference between vkard_actual and vkard_setpoint is identified as $\Delta$vkard_actual, where:

$$\Delta v\text{kard\_actual}=v\text{kard\_actual}-v\text{kard\_setpoint}.$$

So that this non-reduction of engine torque Mmot does not result in a spinning of the wheels, the spinning wheels are both braked simultaneously. The braking operation occurs symmetrically in relation to the left and right wheel of one axle so that no resulting yaw moment arises, which would tend to rotate the vehicle about its vertical axis.

This non-reduction of the engine torque occurs in the TCS control unit in such a way that instead of cardan system deviation Δvkard_actual, a new variable Δvkard_res in the cardan regulator contained in the TCS control unit is regarded as a system deviation.

Figure 3:
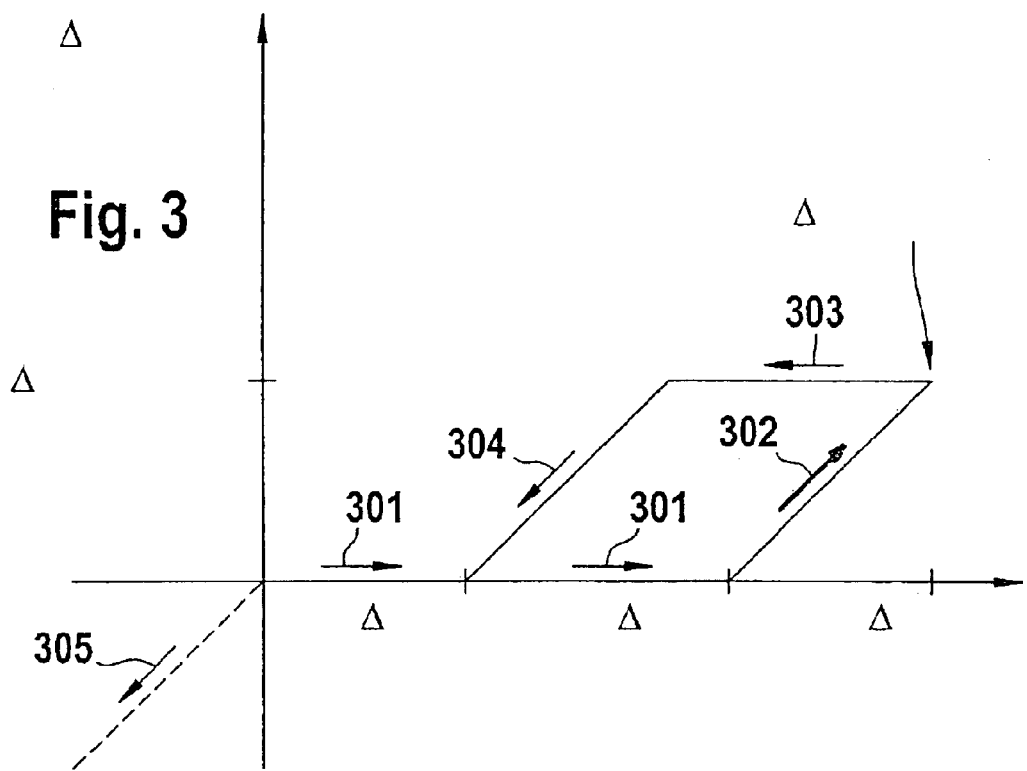
FIG. 3 illustrates the utilization of the hysteresis characteristic for the cardan regulator according to the present invention.

The relation between Δvkard_res and Δvkard_actual is shown in FIG. 3. In it, the value Δvkard_actual is plotted in the direction of the x-axis; the value Δvkard_res is plotted in the direction of the y-axis.

A positive value of Δvkard_actual means that the actual cardan shaft speed (vkard_actual) is greater than the setpoint cardan shaft speed (vkard_setpoint). A regulation to the value vkard_setpoint would now reduce the value vkard_actual and this would be associated with a reduction in the engine torque.

The consideration of the variable Δvkard_res according to the present invention prevents the engine torque from being reduced prematurely. Referring to FIG. 3, this takes place in the following steps:

1. Δvkard_actual may grow to a value Δvkard_start without Δvkard_res assuming a value different from zero. This is shown in FIG. 3 by the two arrows 301. Since Δvkard_res=0, no reduction in the engine torque takes place in this case. In this range, only braking interventions occur at the spinning wheels. This range 0<Δvkard_actual<Δvkard_start is designated as a "dead zone."

2. If Δvkard_actual exceeds the value Δvkard_start, Δvkard_res assumes positive values different from zero. This is shown by the curve identified by arrow 302. In addition to the braking interventions, the engine torque is now increasingly reduced as the value of Δvkard_res increases. For example, Δvkard_res=Δvkard_actual+Δvkard_start applies (if the branch of FIG. 3 identified by 302 now has a slope of 45°).

3. After Δvkard_actual has reached its maximum value and again assumes lower values, Δvkard_res remains constant. The occurring maximum value of Δvkard_res is identified as Δvkard_turn and stored. This is indicated by arrow 303. The engine torque is reduced further since Δvkard_res is greater than zero. It should be noted that Δvkard_turn is not a fixedly set value, but instead Δvkard_turn is the value that Δvkard_res assumes when Δvkard_actual has reached its maximum.

4. When Δvkard_actual has again dropped back to a value Δvkard_turn+Δvkard_stop, the value of Δvkard_res is reduced again (arrow 304). This reduction occurs until Δvkard_actual again falls below the value Δvkard_stop. Δvkard_res is reduced according to the rule Δvkard_res=Δvkard_actual−Δvkard_stop.

If, for example, when passing through step 3 (hysteresis branch denoted by arrow 304), the value of Δvkard_actual abruptly increases again, the momentarily existing system deviation Δvkard_res is then frozen (or stored in vkard_turn) until Δvkard_actual−Δvkard_start has reached a value greater than Δvkard_turn.

The described hysteresis loop prevents vibrations resulting from regulation at the limit of the dead zone. These vibrations may occur, for example, when Δvkard_actual exceeds the value Δvkard_start for only a brief period of time.

The dead zone is eliminated as soon as the vehicle shows unstable behavior.

Figure 4:
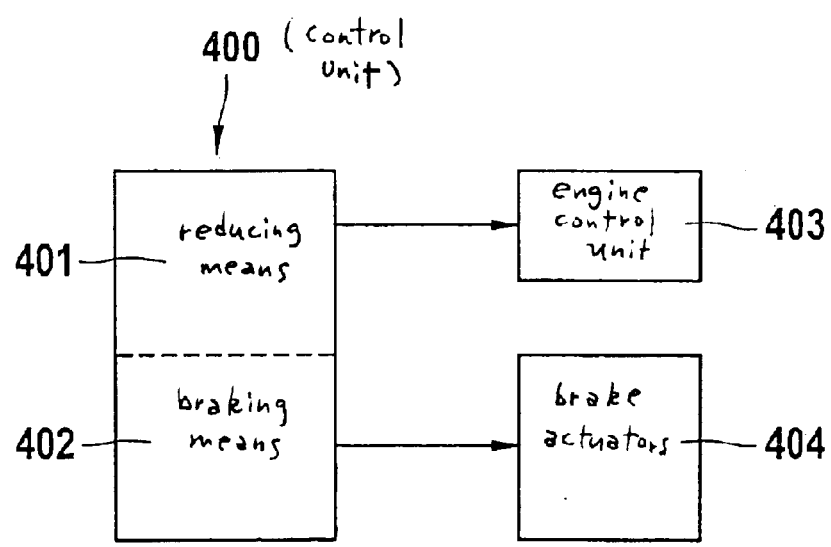
FIG. 4 shows the basic structure of an exemplary embodiment of the device according to the present invention.

In FIG. 4, it may be assumed that the growth rates of Δvkard_res and Δvkard_actual are equal during the phases denoted by arrows 302 and 304. This means that each of the sloping lines (identified by arrows 302, 304, and 305) in FIG. 3 has a slope of 45°. This may be advantageous, but it is by no means mandatory.

FIG. 3 also contains the dashed line identified by arrow 305. It identifies the range Δvkard_actual<0. In this range, the actual cardan shaft speed (vkard_actual) is less than the setpoint cardan shaft speed (vkard_setpoint), i.e., the engine torque is too low. Since an increase in engine torque should take place in this range, Δvkard_actual=Δvkard_setpoint applies to this range.

The first quadrant of FIG. 3 denoted by arrows 301, 302, 303, and 304 may also be characterized in the following way: Whenever a condition in which Δvkard_actual>0 is present, a symmetrical braking intervention is carried out, and whenever a condition of Δvkard_res>0 is present, the engine torque is reduced.

The hysteresis and the delayed application of Δvkard_res results in conditions (arrows 301) in which no reduction in the engine torque occurs (dead zone).

In the following, the method according to the present invention will be explained once more based on an example. For that purpose, a vehicle is taken into consideration, the TCS regulator of which delivers 40% of the engine torque to the front axle and 60% of the engine torque to the rear axle. In addition, the rear axle is located on a low-$\mu$ road surface.

1. The wheels of the rear axle spin due to the lack of friction.

2. An excessively high slip is determined; therefore, vkard_setpoint is reduced. Accordingly, Δvkard—actual=vkard_actual−vkard_setpoint>0. In FIG. 3, the condition follows arrows 301.

3. To eliminate the excessively high slip, symmetrical braking interventions occur at the wheels of the rear axle (arrows 301 in FIG. 3) and in addition, the engine torque is possibly reduced (arrows 302, 303, and 304). According to the present invention, this reduction does not occur until a later point in time (by the use of a dead zone in conjunction with a hysteresis). These interventions occur until the wheels of the rear axle run in the stable slip range. The stable slip range is determined from the slip-speed curve shown in FIG. 1.

4. 40% of the engine torque is delivered to the wheels of the front axle. If the engine torque was reduced in the last step, then 40% of the reduced engine torque is applied to the front wheels.

5. Due to the engine torque delivered to the front wheels, the front axle may possibly become unstable. For that reason, the further regulation takes place at the wheels of the front axle.

The basic structure of an exemplary embodiment of the device according to the present invention is shown in FIG. 4. Block 400 at the left is a part of a control unit, for example, a TCS control unit. This block contains sub-block 401 which contains reducing means for reducing the engine torque and sub-block 402 which contains braking means for carrying out driver-independent braking interventions. The output signals of block 401 are sent to engine control unit 403, which reduces the engine torque via the throttle valve position, for example. The output signals of block 402 are relayed to brake actuators 404.

Figure 5:
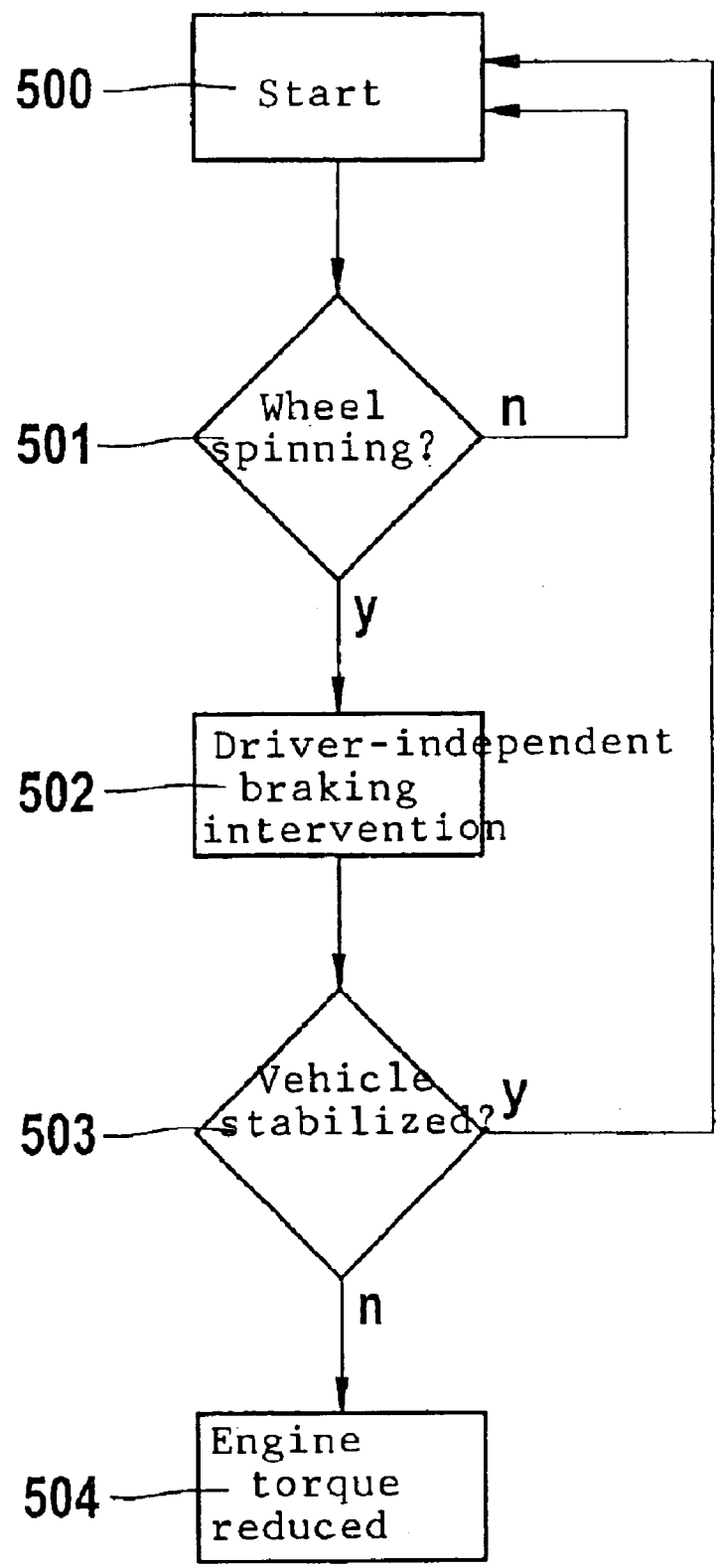
FIG. 5 shows the sequence of operations of an exemplary embodiment of the method according to the present invention.

The sequence of operations of the method according to the present invention is shown in FIG. 5. The method is started in block 500. It is then determined in block 501 if at least one spinning wheel or a wheel tending to spin is present. If this is not the case, the sequence branches back to block 500. If this is the case, the sequence proceeds to block 502. In block 502, a driver-independent braking intervention is carried out at the at least one wheel tending to spin. Subsequently, in block 503 it is checked if the driver-independent braking intervention has resulted in stabilizing the vehicle. If this is the case, the sequence returns to block 500. If this is not the case, the engine torque is reduced in block 504.

With an open center differential, the described invention makes it possible to obtain a very good distribution of the drive power between the front and rear axle. This effect is all the greater, the more greatly the structurally inherent distribution of drive torques deviates from the ideal friction value-dependent distribution.

One object of the present invention is the improvement of traction. The braking interventions are also used to stabilize the vehicle. However, the purpose of the dead zone is first to deliberately redistribute the entire drive power before the drive power is reduced.

What is claimed is:

1. A method for stabilizing a vehicle having an engine and a plurality of wheels, in response to at least one wheel tending to spin, comprising:

activating a driver-independent braking intervention in the at least one wheel tending to spin; and if the driver-independent braking intervention does not result in stabilization of the vehicle, activating a reduction of the engine torque;

wherein the braking intervention occurs with equal intensity at both wheels of a first driven axle of the vehicle.

2. The method according to claim 1, wherein the vehicle is an all-wheel drive vehicle, and wherein during the braking intervention involving the first driven axle, no braking intervention occurs at wheels of a second driven axle.

3. The method according to claim 1, wherein the engine torque is reduced if the difference between a variable determined from wheel rotational speeds of braked wheels and a setpoint value for the variable exceeds a specified first threshold value that is not equal to zero.

4. The method according to claim 3, further comprising:

ending the reduction in engine torque if the difference between the variable determined from the wheel rotational speeds of the braked wheels and a setpoint value for the variable falls below a specified second threshold value that is not equal to zero.

5. The method according to claim 4, wherein the second threshold value is lower than the first threshold value.

6. The method according to claim 4, wherein the variable determined from the wheel rotational speeds of the braked wheels is an actual value of a cardan shaft speed, and the setpoint value for the variable is a setpoint cardan shaft speed.

7. The method according to claim 4, wherein the variable determined from the wheel rotational speeds of the braked wheels is a mean value of wheel speeds of the braked wheels.

8. The method according to claim 1, wherein a differential lock function is used in a longitudinal direction.

9. A device for stabilizing a vehicle having an engine and a plurality of wheels, in response to at least one wheel tending to spin, comprising:

a reducing means for reducing the engine torque; and a braking means for carrying out a driver-independent braking intervention;

wherein the driver-independent braking intervention occurs in the at least one wheel tending to spin, and wherein the engine torque is reduced only if the driver-independent braking intervention does not result in stabilization of the vehicle; and wherein the braking intervention occurs with equal intensity at both wheels of a first driven axle of the vehicle.

10. The device according to claim 9, wherein the vehicle is an all-wheel drive vehicle, and wherein during the braking intervention involving the first driven axle, no braking intervention occurs at wheels of a second driven axle.

11. The device according to claim 9, wherein the engine torque is reduced if the difference between a variable determined from wheel rotational speeds of braked wheels and a setpoint value for the variable exceeds a specified first threshold value that is not equal to zero.

12. The device according to claim 11, further comprising means for ending the reduction in engine torque if the difference between the variable determined from the wheel rotational speeds of the braked wheels and a setpoint value for the variable falls below a specified second threshold value that is not equal to zero.

13. The device according to claim 12, wherein the second threshold value is lower than the first threshold value.

14. The device according to claim 12, wherein the variable determined from the wheel rotational speeds of the braked wheels is an actual value of a cardan shaft speed, and the setpoint value for the variable is a setpoint cardan shaft speed.

15. The device according to claim 12, wherein the variable determined from the wheel rotational speeds of the braked wheels is a mean value of wheel speeds of the braked wheels.

16. The device according to claim 9, wherein a differential lock function is used in a longitudinal direction.

* * * * *